United States Patent
Arndt et al.

(10) Patent No.: US 11,653,787 B2
(45) Date of Patent: May 23, 2023

(54) MILK SUPPLY DEVICE AND METHOD FOR SUPPLYING MILK

(71) Applicant: WMF Group GmbH, Geislingen/Steige (DE)

(72) Inventors: Peter Arndt, Blaustein (DE); Frank Göltenboth, Blaustein (DE); Jochen Gussmann, Schwabisch-Gmünd (DE); Alexander Kiefer, Kuchen (DE); Philipp Schirrmacher, Ulm (DE); Armin Startz, Weidenstetten (DE)

(73) Assignee: WMF GmbH

( * ) Notice: Subject to any disclaimer, the term of this patent is extended or adjusted under 35 U.S.C. 154(b) by 753 days.

(21) Appl. No.: 16/604,087

(22) PCT Filed: Mar. 13, 2018

(86) PCT No.: PCT/EP2018/056220
§ 371 (c)(1),
(2) Date: Oct. 9, 2019

(87) PCT Pub. No.: WO2018/192716
PCT Pub. Date: Oct. 25, 2018

(65) Prior Publication Data

US 2020/0146503 A1     May 14, 2020

(30) Foreign Application Priority Data

Apr. 21, 2017   (DE) ............... 10 2017 206 767.5

(51) Int. Cl.
*A47J 31/60* (2006.01)
*A47J 31/46* (2006.01)
*A47J 31/44* (2006.01)

(52) U.S. Cl.
CPC ........... *A47J 31/60* (2013.01); *A47J 31/4485* (2013.01); *A47J 31/461* (2018.08); *A47J 31/469* (2018.08)

(58) Field of Classification Search
CPC ...... A47J 31/56; A47J 31/3671; A47J 31/469; A47J 31/30; A47J 31/41; A47J 31/467;
(Continued)

(56) References Cited

U.S. PATENT DOCUMENTS

2008/0163896 A1\* 7/2008 Ioannone ............... A47J 31/60
                                                                                  134/133
2009/0183754 A1   7/2009 Vetterli et al.
(Continued)

FOREIGN PATENT DOCUMENTS

CN     101489452 A     7/2009
CN     101528095 A     9/2009
(Continued)

OTHER PUBLICATIONS

Korean Office Action with English Translation, dated Feb. 28, 2022, pp. 1-4, Issued in Korean Patent Application No. 10-2019-7033937, Korean Intellectual Property Office, Daejeon, Republic of Korea.
(Continued)

*Primary Examiner* — Phuong T Nguyen
(74) *Attorney, Agent, or Firm* — Crowell & Moring

(57) ABSTRACT

A milk supply device for supplying milk from a milk supply container to a milk dispensing device is provided. The milk supply device comprises a milk transport line which can be connected to the milk supply container and with which milk which has been taken from the milk supply container can be delivered to the milk dispensing device. The milk supply device further comprises a three-way junction, which can be operated such that optionally milk can be transported from the milk supply container to the milk dispensing device,
(Continued)

whilst the milk transport line is sealed off by it, at the same time, relative to the cleaning agent transport line, in a fluid-impermeable manner, or cleaning agent can be conducted from the cleaning agent transport line in the direction towards the milk dispensing device and/or in the direction towards a discharge of the milk supply device.

19 Claims, 10 Drawing Sheets

(58) Field of Classification Search
CPC ........ A47J 31/002; A47J 31/545; A47J 31/60; A47J 31/461; A47J 31/4485
USPC ... 99/323.1, 323.2, 316, 309, 304–305, 290, 99/295, 297, 289 R, 287, 280, 281, 288, 99/275
See application file for complete search history.

(56) References Cited

U.S. PATENT DOCUMENTS

| | | |
|---|---|---|
| 2010/0083841 A1 | 4/2010 | Bergeron et al. |
| 2011/0083561 A1 | 4/2011 | Douma et al. |
| 2015/0245735 A1 | 9/2015 | Stutz |
| 2017/0290458 A1 | 10/2017 | Burrows |

FOREIGN PATENT DOCUMENTS

| | | |
|---|---|---|
| CN | 201775480 U | 3/2011 |
| CN | 102056523 A | 5/2011 |
| CN | 202173269 U | 3/2012 |
| CN | 202714725 U | 2/2013 |
| DE | 10 2006 047 969 A1 | 4/2008 |
| DE | 20 20 2009 007 945 U1 | 8/2009 |
| DE | 20 2012 009 076 U1 | 1/2013 |
| DE | 10 2012 200 280 A1 | 7/2013 |
| DE | 10 2012 214 104 A1 | 2/2014 |
| EP | 1 911 382 A1 | 4/2008 |
| EP | 2 078 481 A1 | 7/2009 |
| EP | 2 133 010 A1 | 12/2009 |
| EP | 2 869 066 A1 | 5/2015 |
| JP | S57-114473 U | 7/1990 |
| JP | 2008-094499 | 4/2008 |
| JP | 2016/159963 A | 9/2016 |
| JP | 2017-30828 A | 2/2017 |
| JP | 2017-529989 A | 10/2017 |
| WO | WO 2008/006623 A2 | 1/2008 |
| WO | WO 2009/150616 A1 | 12/2009 |

OTHER PUBLICATIONS

Chinese Office Action with English Translation, dated Jan. 18, 2022, pp. 1-15, issued in Chinese Patent Application No. 2018800262710, China National Intellectual Property Administration, Beijing, People's Republic of China.

Chinese Office Action with English Translation, dated Sep. 16, 2021, pp. 1-18, issued in Chinese Patent Application No. 2018800262710, China National Intellectual Property Administration, Beijing, People's Republic of China.

Japanese Office Action with English Translation, dated Feb. 22, 2022, pp. 1-10, issued in Japanese Patent Application No. 2019-557414, Japanese Patent Office, Tokyo, Japan.

International Search Report, issued in International Application PCT/EP2018/056220, dated May 24, 2018, European Patent Office, Rijswijk, Netherlands.

Taiwan Office Action with English translation, issued in Taiwan Application 107113221, dated Feb. 21, 2019, pp. 1-25, Taipei, Taiwan, Republic of China.

Chinese Office Action and English Translation for Chinese Patent application No. CN 201880026271.0, dated Mar. 31, 2021, pp. 1-16.

Korean Office Action with English Translation, dated Sep. 30, 2022 issued in Korean Patent Application No. 10-2019-7033937, Korean Intellectual Property Office, Daejeon, Republic of Korea (7 pp.).

\* cited by examiner

| Angular Position | A | B | C | D | E | F |
|---|---|---|---|---|---|---|
| 0° | Unused | | | | | |
| 25° | B/C | A/C | A/B | closed | closed | closed |
| 75° | Rapid Cleaning and Intensive Cleaning Milk 1 | C | closed | A | E | D | closed |
| -25° | Normal Operation Milk 1 | C | closed | A | closed | closed | closed |
| -75° | Rapid Cleaning and Intensive Cleaning Milk 2 | closed | C | B | F | closed | D |
| 180° | Normal Operation Milk 2 | closed | C | B | closed | closed | closed |
| | Deep Cleaning | closed | closed | D | C | closed | closed |

Fig. 10

MILK SUPPLY DEVICE AND METHOD FOR SUPPLYING MILK

CROSS-REFERENCE TO RELATED APPLICATIONS

This application is a 371 nationalization of international patent application PCT/EP2018/056220 filed Mar. 13, 2018, which claims priority under 35 USC § 119 to German patent application 102017206767.5 filed Apr. 21, 2017. The entire contents of each of the above-identified applications are hereby incorporated by reference.

BRIEF DESCRIPTION OF THE DRAWINGS

FIG. 10 shows which line connections of connections A to F lead to which fluid line connections.

DETAILED DESCRIPTION

Figure 1:
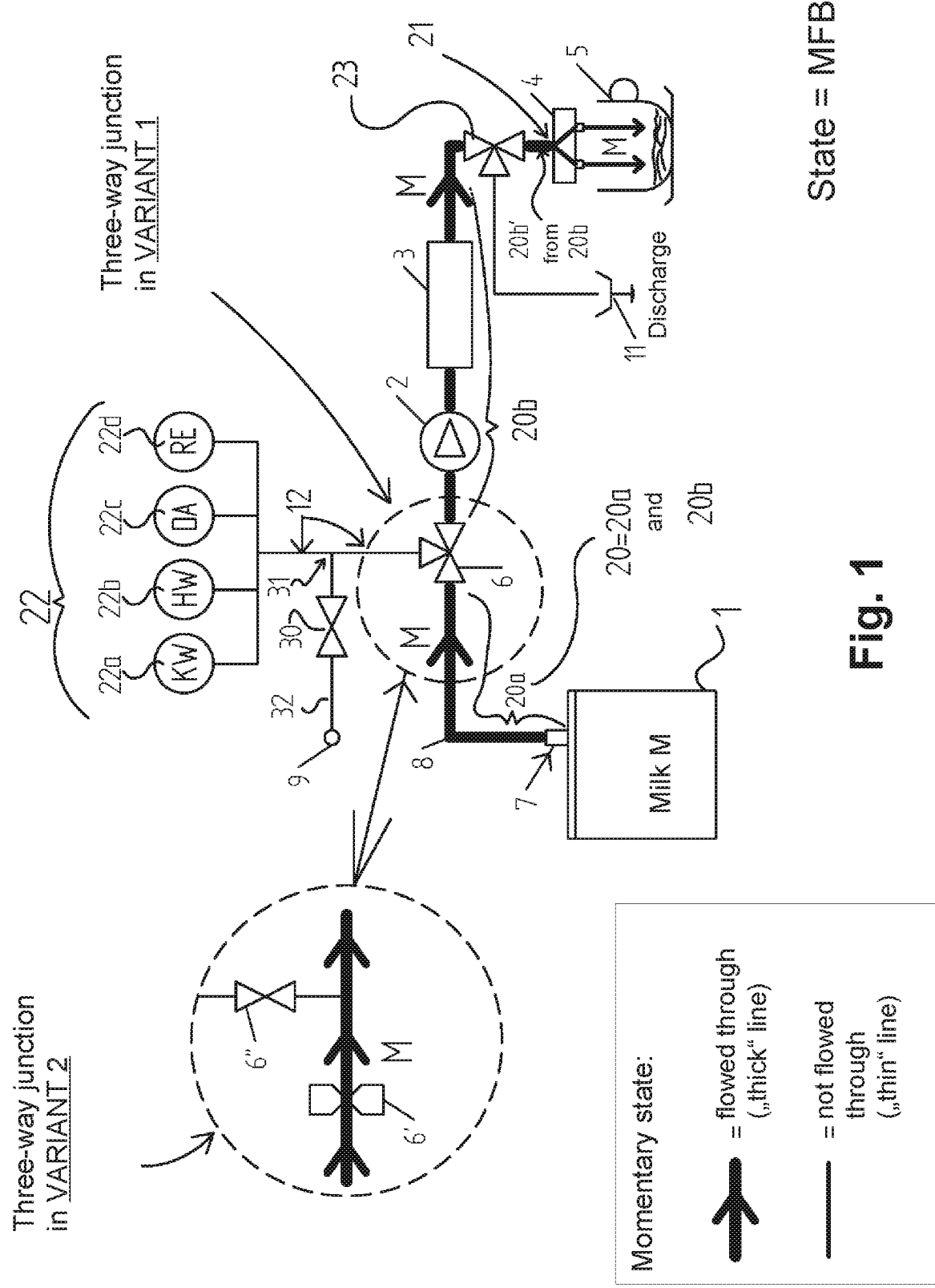
FIG. 1 shows a first embodiment of an electrical coffee machine according to the invention with a milk supply device according to the invention

The present invention relates to a milk supply device, to a drinks preparer (in particular: electrically operated coffee machine) with such a milk supply device and also to a method for supplying milk.

Milk supply devices or drinks preparers with such milk supply devices (these are subsequently also termed alternatively milk systems) must be cleaned regularly in order to prevent potential microbial growth and a build-up of milk residues. For regular cleaning of the milk system, a manual intervention is thereby required which, in professional use and/or in corresponding use, must often take place daily. This is time-consuming and, in the case of professional use, operating personnel with corresponding knowledge for implementing the cleaning must be on site.

It is the object of the present invention to improve the cleaning of a milk supply device or of a drinks preparer, in particular to increase the degree of automation during cleaning. This should be designed such that few to absolutely no manual interventions in the milk system are required.

This object is achieved by the milk supply device the drinks preparer and also the method Advantageously achievable variants can thereby be deduced.

Being in fluid connection with the milk transport line of the cleaning agent transport line can be by entry of the cleaning agent transport line into the milk transport line. In the milk flow operating state, the entry of the cleaning agent transport line into the milk transport line can thereby be closed for example by means of a valve of the three-way junction.

The operation according to the two different line system states (said line system comprises the milk transport line and also the cleaning agent transport line) can be effected such that the milk supply device is switched from a first operating state (milk flow operating state according to the first bullet point: milk flow to the milk dispensing device, in the case of a cleaning agent flow which is completely separated from this milk flow and/or in the case of an interrupted cleaning agent flow) into one, of one or more, different operating state/states (cleaning operation state or cleaning operation states according to the second bullet point: cleaning agent flow towards the milk dispensing device and/or to the discharge in the case of a milk flow which is completely separated from this cleaning agent flow and/or in the case of an interrupted milk flow) and vice versa.

The milk supply device can be configured such that a plurality of cleaning operation states is produced according to the second bullet point. This can be effected by microprocessor control or computer control, the milk supply device can therefore comprise for example a microcontroller which has a program memory in which one or more suitable control program/s can be stored or is/are stored. The milk supply device can therefore have a central control unit which comprises a microprocessor and comprises a program memory. The program memory can comprise suitable control programs for changing (switching) between the operation of the device in milk flow operating state and in the cleaning operation state/states or for changing (switching) from one cleaning operation state to another cleaning operation state (or be configured for receiving such control programs). Changing or switching between the operating states can be effected by means of one or more valve/valves.

The milk supply device can be a separate, i.e. independently operable ("stand alone") device, a separate device (e.g. accommodated in a separate housing), connectible to an automatic drinks machine (e.g. electrical coffee machine or fully automatic coffee machine or also tea machine), i.e. be a device external to the automatic drinks machine or also be a device which is integrated in such an (i.e. above all in the housing thereof) automatic drinks machine.

The milk supply container is normally external to the milk supply device (but can also be part of the milk supply device). Generally, external means here that the milk supply container is positioned separately outside the housing of the milk supply device and is connected to the milk supply device or to a housing of the same. The cleaning agent can be supplied from this cleaning agent reservoir, i.e. can be conducted for example from a cleaning agent reservoir into the cleaning agent transport line and, via the latter, into the three-way junction. The cleaning agent reservoir can be configured to be external to the milk supply device but can also be a cleaning agent reservoir which is integrated in the milk supply device. The milk transport line is generally connectible or connected detachably to the milk supply container by the one of its ends.

The cleaning agent being conductible via the three-way junction in the direction towards the milk dispensing device can mean that the cleaning agent is conducted via an outflow portion of the milk transport line into the milk dispensing device (and from the latter into an external vessel such as for example a cup) such that the outflow portion is washed completely, i.e. from the start to the end (i.e. is washed from the three-way junction up to and including the end of the outflow portion, situated opposite the latter, including the milk dispensing device). Compare in this respect the subsequent embodiments according to FIGS. 2, 4 and 5. This can however also mean (cf. subsequent embodiment of e.g. FIG. 3) that cleaning agent in the outflow portion is discharged from the outflow portion by means of e.g. a valve which is positioned upstream of the milk dispensing device, and is discharged separately via the discharge (then a short line piece between said valve and the milk dispensing device not being washed with cleaning agent). Obviously, for example both the discharge and said short line piece can also be washed at the same time.

In any case, a fluid connection of the milk supply container to the milk supply device (or to components of the same) can be interrupted according to the invention if the milk supply device is in the or in a cleaning operation state.

The fluid can be milk (in the milk flow operating state) or (in a cleaning operation state, cf. for example FIG. 3 or 4), it can be a cleaning agent. Preferably, the three-way junction can be switched also, with respect to its fluid transport directions, such that (for example after introducing cleaning agent as fluid from the cleaning agent transport line via the three-way junction in the milk transport line), outflow of fluid from the three-way junction into the inflow portion of the milk transport line is made possible (cf. in this respect for example the embodiment according to the FIG. 5 or cf. subsequently, the third cleaning operation state).

This first cleaning operation state—likewise however also possibly other further available cleaning operating states—can be implemented on the basis of a microprocessor or on the basis of a computer, for example by means of a microcontroller which comprises a program memory and in which a suitable control program can be stored or is stored. The first cleaning operation state describes a flow variant of the cleaning agent, as is shown for example in FIG. 2, which is subsequently also termed alternatively basic cleaning.

Preferably, the second connection has a line which opens into the cleaning agent transport line. Said entry can be configured for example as a T-shaped line piece. The entry of the line of the second connection into the cleaning agent transport line is effected preferably between a/the cleaning agent reservoir and the three-way junction and/or is effected preferably fluid-upstream of the three-way junction.

This second cleaning operation state describes a flow variant of cleaning agent, as is shown for example in FIG. 3, which is subsequently also termed alternatively rapid cleaning. Preferably, the conduction of the cleaning agent in the direction towards the milk dispensing device is effected such that the cleaning agent is branched off still upstream of the milk dispensing device and discharged via the discharge of the milk supply device, which is configured separately with respect to the milk dispensing device, out of said milk supply device.

This cleaning operation state variant, which is described subsequently for example also in more detail in FIG. 4, describes an intensive cleaning. (In addition, also the milk supply container can be cleaned as well during such an intensive cleaning provided it is not a disposable container). Preferably, the conduction of the cleaning agent in the direction towards the milk dispensing device is effected such that the cleaning agent is discharged into an external vessel via the milk dispensing device (so that the milk dispensing device is also cleaned).

The connection state detection device can thereby comprise a sensor, preferably a Hall- or a Reed sensor. In particular, a cleaning operation state can be triggered automatically if the connection state detection device establishes that a fluid-impermeable connection is produced between the first connection and the second connection. The connection release-prevention device can have a locking device which can comprise for example an actuator (e.g. locking motor or lifting magnet). As additional safety device the locking device can also switch a 3/2-way outflow valve in the direction of the discharge and ensure that a/the conveying device (e.g. pump) is only switched on if the three-way junction is available for cleaning.

The first connection portion can be configured in particular for fluid-impermeable connection of the first connection to the milk supply container. For this purpose, the first connection portion can be connected detachably to a milk container connection of the milk supply container. Preferably, the first connection portion and the second connection portion are configured such that, in the fluid-impermeable connected state of the first connection and of the second connection, the first connection portion can be washed with cleaning agent at least in portions, preferably completely, said cleaning agent flowing from the second connection into the first connection (or vice versa). Compare also in this respect FIG. 7. A third connection (cf. subsequently and also FIG. 5) can be configured in the same form as the second connection so that pairing of the first connection also with the third connection is possible via the second connection portion. Alternatively, the second connection portion can be configured for fluid-impermeable connection of the first connection to the then differently shaped third connection.

The bypass line can hence be partially (or also completely) also a rigid line guide, for example a rigid tubing.

Also according to this third cleaning operation state, an intensive cleaning can be implemented. In addition to the cleaning agent flow guide described here, also cleaning agent can be guided via the outflow portion of the milk transport line into the discharge of the milk supply device and/or be discharged via the milk dispensing device of the milk supply device.

Figure 5:
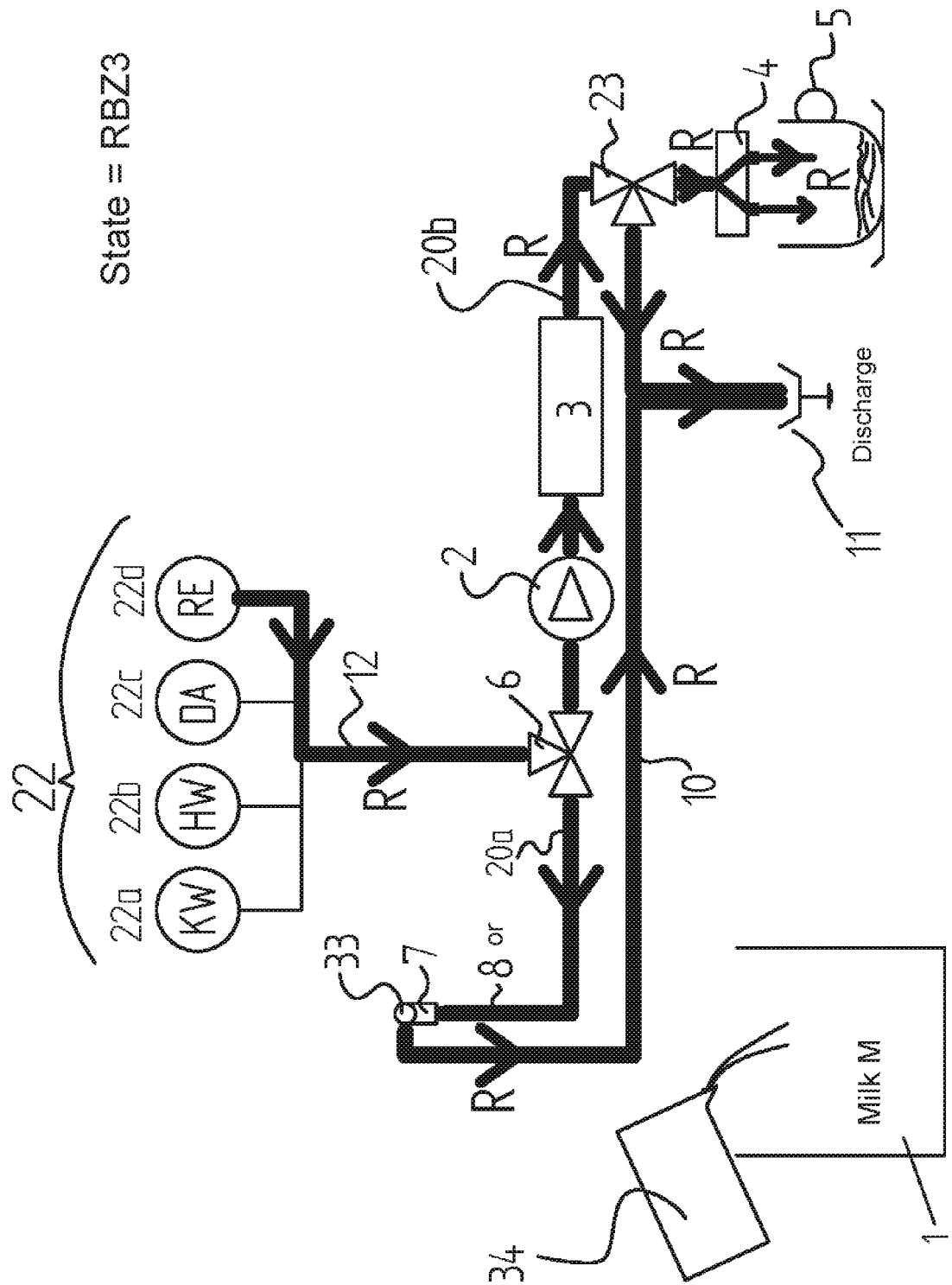
FIG. 5 shows a second electrical coffee machine according to the invention with milk supply device according to the invention.

With respect to the cleaning operation state, cf. also the flow variant of the cleaning agent shown in FIG. 5. The three-way junction can thereby be switched such that the outflow portion side (i.e. the outflow portion of the milk transport line) is separated from a fluid flow. In this case, merely the inflow portion of the milk transport line (or the first connection and a flexible hose as inflow portion) is cleaned and cleaning agent is discharged via the bypass line and the discharge of the milk supply device out of the latter.

In a variant of the invention, the three-way junction can be switched such that also the outflow portion side or the outflow portion of the milk transport line is opened for the flow of cleaning agent so that in addition (cf. FIG. 5) also this outflow portion side is cleaned. In order to wash both the inflow portion and the outflow portion of the milk transport line, the three-way junction can be configured as 3/3-way valve. (Generally, in fact two connection states are required in order to connect the cleaning agent transport line to the inflow portion and/or to the outflow portion of the milk transport line for fluid passage; in addition a further connection state is required in order to block the cleaning agent transport line to be fluid-impermeable relative to the milk transport line and to connect the inflow portion via the three-way junction to the outflow portion for fluid passage.)

A change, in particular: switch, can thereby be made both between the milk flow operating state, on the one hand, and one of the cleaning operation states, on the other hand (and vice versa), and between different cleaning operation states. Hence the invention makes it possible, at different times or in different states of the milk supply device, to implement different types of cleaning (e.g.: intensive cleaning or basic cleaning).

Each operating state (milk flow operating state and cleaning operation state/states) is thereby preferably a switching or connection state of one or more valve/valves, cf. also subsequently. The three-way junction can hence be configured such that, in addition to the milk flow operating state, only exactly one (any of the above-mentioned) cleaning operation state is produced or selectable such that exactly two (any of the above-mentioned) cleaning operation states are produced or selectable or that exactly the three above-mentioned cleaning operation states are produced or selectable. Also more than three cleaning operation states (in addition to the milk flow operating state) can of course be produced within the scope of the invention (preferably: with program control), i.e. the milk supply device can be operated in more than three cleaning operation states.

In other words, advantageously two, three or even more different cleaning operation states can be operated optionally. See also subsequent embodiments or Figures. Cleaning agent can thereby be conducted through the three-way junction in different flow directions, flow into the three-way junction via different inlets of the same and/or flow out again from the three-way junction via different outlets of the same.

For example, a two-stage cleaning approach is possible, in which, in a first stage, cleaning agent can be conducted automatically (while the inflow portion of the milk transport line is connected or while the flexible hose is connected via the first connection to the milk supply container) through the milk supply device. Cf. in this respect, e.g. FIG. 2. In a second stage, subsequently (for this purpose the inflow portion of the milk transport line or the flexible hose being connected via the first connection to the second connection in advance on the user side) rapid cleaning can be implemented. The latter is only perceived by a user unconsciously: actively, merely the first connection must be connected to the second connection. Coupling the second connection to the first connection can then be detected and subsequently rapid cleaning can be started automatically (cf. e.g. FIG. 3).

Said detection can be effected thereby electromechanically: for example a bayonet coupling can actuate a microswitch with a cam. In another variant, the first connection and the second connection respectively have an electrical contact; if the two electrical contacts are in contact during the mechanical coupling, then a current circuit can be closed, which can be used for detection. Likewise, a magnetic switch or a Reed sensor can be used.

Also multistage cleaning approaches with more than two stages are possible.

A return flow of cleaning agent (R) from the outflow portion (20*b*) and/or from the cleaning agent transport line (12) through the three-way junction (6, 6', 6") into the inflow portion (20*a*) can be undesired at least during the first cleaning operation state.

A return flow safety device can be produced as follows: e.g. a pump, which is configured as gear-type pump, can run backwards. Provided the pressure measured by the pressure sensor is too low or is below a predefined pressure, the presence of an undesired return flow is detected. Alternatively thereto, an undesired return flow can be detected if, despite an operation of a/the pump in forwards direction, the pressure sensor does not measure a sufficient pressure. (Of course, within the scope of the invention, also any other fluid conveying device can be used instead of a pump.) If an undesired return flow is detected, for example a status report can be issued on a screen (i.e. display) of the milk supply device or of a drinks preparer comprising this. An alarm report can also be issued on such a screen. Such an alarm can be issued also acoustically (or also optically, e.g. via a flashing signal). Finally, even the milk supply device or the drinks preparer can be switched off automatically in the case of an undesired return flow.

The milk supply device can therefore switch between different milk supply containers, according to what type of milk is desired (different milk supply containers can be filled, for example with different types of milk, such as e.g. low fat milk, normal milk and lactose-free milk). In the milk flow operating state, milk can thereby be transported respectively via the three-way junction out of the currently selected milk supply container to the milk dispensing device whilst, by the three-way junction, the milk transport line is sealed off, at the same time, relative to the cleaning agent transport line, in a fluid-impermeable manner. Compare in this respect also the embodiment according to FIG. 6.

The disc elements can be flat (e.g. flat cylinder-shaped) bodies. However, also non-flat, for example cuboid, bodies are conceivable as disc elements. The disc planes of these flat bodies are thereby orientated preferably all parallel to each other and perpendicular to the axis of rotation. The plurality of line connections can all be configured in/on exactly one of the two disc elements. A plurality of valves used in the present invention can hence be configured in common by the multiple connection device.

According to the invention, a high-grade automated cleaning can hence be implemented without intervention into the milk system (or the milk supply device) being required. Individual components of the milk system which cannot be included, can be washed briefly of milk residues in a rapid cleaning during a normal milk filling process and be disinfected with thermal (or even chemical) means. The operating personnel are barely or not at all restricted in the time of attending and, apart from the typical milk filling process, they require to perform practically no additional tasks.

If the inflow portion is configured as a flexible hose, then cleaning agent can be supplied safely to the milk supply device when the milk connection hose is inserted in the milk supply container without there being a danger of contamination of the milk supply with cleaning agent. The invention hence offers a cleaning system for milk-conducting parts of a milk supply device or of a coffee machine, cleaning of these parts being possible, entirely independently of the milk supply container, completely up to this container. Hence a high degree of automation of the system is provided. Cleaning of the milk supply device relative to the milk supply container taking place temporally offset or cleaning of the milk supply device taking place temporally offset with exchange of the milk supply container makes possible optimised cleaning without cross-contamination of connections on the supply container to the milk supply device and vice versa. According to the invention, a technical fluid separation of the machine-side milk system or of the milk supply device, on the one hand, from the milk supply container, on the other hand, is thereby effected.

The milk supply device can be cleaned automatically, for which purpose the fluid connection between milk supply container and milk supply device is interrupted (e.g. via a butterfly valve, see subsequently) and a washing or cleaning agent is supplied to the milk supply device or is guided through the latter. The flexible milk connection hose or inflow portion of the milk transport line can be cleaned with high intensity by means of its first connection (adapter) in short intervals of the filling with milk of the milk supply container or during a change of the milk supply container.

Subsequently, the present invention is described again with reference to several embodiments including the advantages thereof.

The milk supply device of the first embodiment, shown in FIG. 1, is integrated in a housing (not shown) of an electrical coffee machine (here: fully automatic coffee machine). Outside this housing are located the machine-external milk supply container (1) which can be connected via the first connection (7) of the flexible hose (8) of the inflow portion (20a) to the milk transport line (20) (comprising the inflow portion (20a) and the outflow portion (20b)) of the milk supply device. Hence, also the end, orientated towards the first connection (7), of the flexible hose (8) or of the inflow portion (20a) are situated outside the coffee machine in order that a fluid-impermeable connection to the milk supply container (1) is made possible and hence a user can connect said end of the inflow portion (20a) by means of the first connection (7) in a fluid-impermeable manner to the second connection (9) (see subsequently).

Likewise externally of the machine- or fully automatic coffee machine (i.e. outside the housing of the fully automatic coffee machine, not shown), there is situated the external vessel in the form of a cup (5). In the illustrated case, the cleaning agent reservoir (22) comprising a plurality of spaces or chambers (22a) to (22d) for different types of cleaning agent R is disposed in the interior of the housing of the fully automatic machine, the individual spaces or chambers (22a) to (22d) being accessible via flaps in the housing (not shown).

In a first variant ("variant 1"), the three-way junction is configured as 3/2-way valve (6). See in this respect the circle in the centre of FIG. 1 which is illustrated in broken lines. Alternatively thereto, in a second variant of the first embodiment ("variant 2"), the three-way junction can be configured as a combination of exactly two valves, namely a 2/2-way valve (6") and a squeezed tube valve (6') (cf. broken-line circle on the left in FIG. 1). Subsequently, firstly variant 1 is described, variant 2 being constructed in the same way so that exclusively the differences from variant 1 are described subsequently.

One end of the inflow portion (20a) of the milk transport line (20) is hence connectible by means of the first connection (7) in a fluid-impermeable manner to the milk supply container (1) (FIG. 1 shows this connected state). The end of the inflow portion (20a), situated opposite this end, is connected to one of the three entrances of the valve (6) (variant 1). In the illustrated case, a completely flexible line connection between the first connection (7) and the valve (6) is provided, i.e. the inflow portion (20a) of the milk transport line (20) is configured as a flexible hose (8) along its entire length. A second entrance of the 3/2-way valve (6) is connected via the outflow portion (20b) of the milk transport line (20) to the milk dispensing device (4) of the fully automatic coffee machine. The first connection (7) hence corresponds to a first end (7) of the milk transport line (20) orientated towards the supply container (1) and, via the second end (21) of the milk transport line (20) which is situated orientated away from this first end (7), the fluid guided in the milk transport line (20) can be delivered to the milk dispensing device (4) and from there into the external cup (5). The two portions (20a) and (20b) of the milk transport line (20) are hence connected to each other via the valve (6) or the valve (6) is positioned in the milk transport line (20).

Viewed in the direction from the valve (6) towards the milk dispensing device (4), the outflow portion (20b) has, in the subsequent sequence, the following components (i.e. a fluid flowing in portion (20b) from the valve (6) to the dispensing device (4) flows through these components in the subsequent sequence): a fluid conveying means (2) (here: pump), a system (3) for heating the fluid and/or for introducing air and/or for introducing steam into the fluid (i.e. for example for producing warm milk or milk froth) and a 3/2-way outflow valve (23). The latter can make possible, in a first connection position, the outflow of fluid from the outflow portion (20b) exclusively via the milk dispensing device (4) (i.e. via a short line piece (20b') of the portion (20b) which is connected to a first entrance of the valve (23) and located between the valve (23) and the milk dispensing device (4)). The fluid then flows into the cup (5). In a second connection position of the valve (23), exclusively outflow of the fluid via the separate discharge (11) is made possible, into which a second entrance of the valve (23) leads. (The third entrance of the valve (23) is connected to the system (3), i.e. serves for inflow of fluid flowing from the system (3) into the valve (23).) The discharge (11) serves in particular for discharging cleaning agent R as fluid, cf. subsequently. Finally, the valve (23) can, in an intermediate connection position, enable simultaneous fluid outflow both via the discharge (11) and via the milk dispensing device (4).

As conveying means (2), a pump (e.g. gear-type pump) can be used. Also peristaltic pumps, oscillation impeller pumps or vane-cell pumps can be used as conveying means (2).

Via the third entrance of the 3/2-way valve (6), the latter (and hence the milk transport line (20)) is connected to a cleaning agent transport line (12). On the side of the line (12) situated orientated away from its entrance into the valve (6), the cleaning agent reservoir (22) is configured, which reservoir has here in total four different cleaning agent containers as chambers (22a) to (22d). An outlet into the line (12) leads from each of the chambers (22a) to (22d), so that four different cleaning agents can be made to flow from the reservoir (22) into the line (12). As first cleaning agent, cold water KW can be taken from the chamber (22a). As second cleaning agent, hot water HW can be taken from the chamber (22b). As third cleaning agent, steam DA can be taken from the chamber (22c). As fourth cleaning agent, a cleaning liquid RE can be taken from the chamber (22d). Each of these cleaning agents per se or also mixtures of a plurality of these cleaning agents can be added as cleaning agent R (cf. also subsequently) to the line (12).

Viewed from the reservoir (22) on the side orientated towards the entrance of the line (12) into the valve (6) (between the confluence of the four chambers (22a) to (22d) and from the entrance into the valve (6)), a line (32) opens into the line (12) via a T-shaped line piece (31). Via the line (32), the second connection (9) of the milk supply device is connected to the cleaning agent transport line (12), a 2/2-way valve (30) in the line (32) being positioned between the second connection (9) and the T-shaped line piece. According to the connection state of the valve (30), fluid coming from the second connection (9) can hence flow through the line (32) and the T-piece (31) into the line (12) or not (in the last case, the valve (30) closes).

FIG. 1 shows the milk flow operating state, subsequently abbreviated to MFBZ, of the milk supply device of the first embodiment. It thereby applies here, as also for the subsequent Figures, that lines or line portions which are drawn in thick lines and/or provided with arrows are flowed through with fluid in the momentary state, whereas lines or line portions drawn in thin lines and/or lines or line portions not provided with arrows are not flowed through momentarily with fluid.

In the MFBZ, milk M is conveyed from the container (1) via the first connection (7) or the first end of the transport line (20) into the hose (8). The milk M flows in the hose (8) or in the inflow portion (20a) into the valve (6) and from there into the outflow portion (20b). The valve (6) is connected such that the entrance of this valve to the cleaning agent transport line (12) closes so that inflow of cleaning agent R (cf. subsequent Figures) from the reservoir (22) or from the line (12) into the line (20) is reliably prevented. The pump (2) ensures conveyance of the milk M, through which pump the milk M flows finally into the system (3) (where the milk can be heated, can be mixed with steam, can be mixed with air or even can be mixed both with steam and with air) and from there is conveyed into the valve (23). The connection position of the valve (23), in the illustrated MFBZ, is such that the milk M flows through this valve (23) into the line portion (20b'), from there into the dispensing device (4) and finally from the latter (4) into the cup (5) (the entrance of the valve to the discharge (11) closes hence in the illustrated MFBZ).

Also variant 2 of the first embodiment operates analogously to that described previously, with the difference that the valve (6) here is replaced by two individual valves, namely a squeezed tube valve (6'), accommodated in the inflow portion (20a), and a 2/2-way valve (6"), accommodated in the cleaning agent transport line (12). A simple, T-shaped line piece thereby connects the inflow portion (20a), the outflow portion (20b) and the transport line (12), cf. broken-line circle on the left in the picture. In the illustrated MFBZ, the 2/2-way valve (6") hence blocks any cleaning agent supply from the reservoir (22), whereas the squeezed tube valve (6') is opened in order to enable throughflow of milk M through the line (20).

FIG. 1 shows hence a milk system in which milk M is stored in a milk container 1. The milk M is conveyed via the inflow portion (20a) or the flexible hose (8) by means of the conveying means (2) to a discharge region (milk dispensing device (4)). Between milk container (1) and discharge region (4), heating systems or systems (reference number 3) for introducing air and/or steam for preparation of warm milk or milk froth are located. These systems (3) are only illustrated schematically here. The systems (3) can also be omitted (then merely addition of milk M in the form or temperature present in the container is possible).

The milk suction hose (8) is coupled by means of a connection piece or of the connection (7) to the milk supply (1) or can be coupled thereto. Via a supply device or supply line for cleaning- or washing agent (12), the system can be washed or cleaned. In order that no cleaning agent R penetrates into the milk supply (1) and into the milk flowing in the milk transport line (20), the milk supply- or milk transport line (20) is separated between the region of the cleaner supply (i.e. the entry of the line (12) into the line (20)) and the milk supply (1) by a separating device (6) or (6', 6").

In variant 1, the separating device (6) consists of a 3/2-way valve (however also a 3/3-way valve can be used). In variant 2, the separating device (6', 6") consists of a combination of a squeezed tube valve (6') and a 2/2-way valve (6") for the cleaning supply. The machine-side milk system can hence be cleaned in a fully automatic way, with the exception of the connection hose piece up to the position (6) or (6'). In variant 1, the separating point does not thereby sit in a blind path during cleaning (in this respect variant 1 is therefore better than variant 2 since, in the case of the latter, such a blind path portion exists).

For monitoring the sealing function of the separating point, a pressure can be built up on the system to be cleaned (for example by means of the conveying device (2)). Such a pressure build-up can be detected by a pressure sensor (16) (cf. FIG. 2, in FIG. 1, this sensor (16) is not shown for reasons of clarity but is present). The sensor (16) thereby measures the pressure existing, on the one hand, in the line (20) or the outflow portion (20b) between the three-way junction (6) or (6', 6") and, the conveying device (2) on the other hand. The pressure can thereby be applied, for example, by forming the conveying device (2) as gear-type pump and having this run backwards. If the sensor (16) then establishes that the pressure is not sufficiently high, then leakage through the separating point (6) or (6', 6") in the direction towards the hose (8) exists. In such a case, the milk supply device can trigger a warning or an alarm. As an alternative thereto, it can be established in the fluid flow state of FIG. 2 (cf. subsequently) that an undesired leak in the region of the separating point (6) or (6', 6") is present (which could lead to contamination of milk M with cleaning agent R), if the sensor (16), despite the pump operation with respect to the cleaning agent R, does not measure a sufficiently high pressure (i.e. the value of the pressure is below a predetermined pressure reference value): in such a case, there is insufficient pressure because fluid or liquid is crossing via the separating point in the direction of the hose (8) or towards the end (7).

Figure 2:
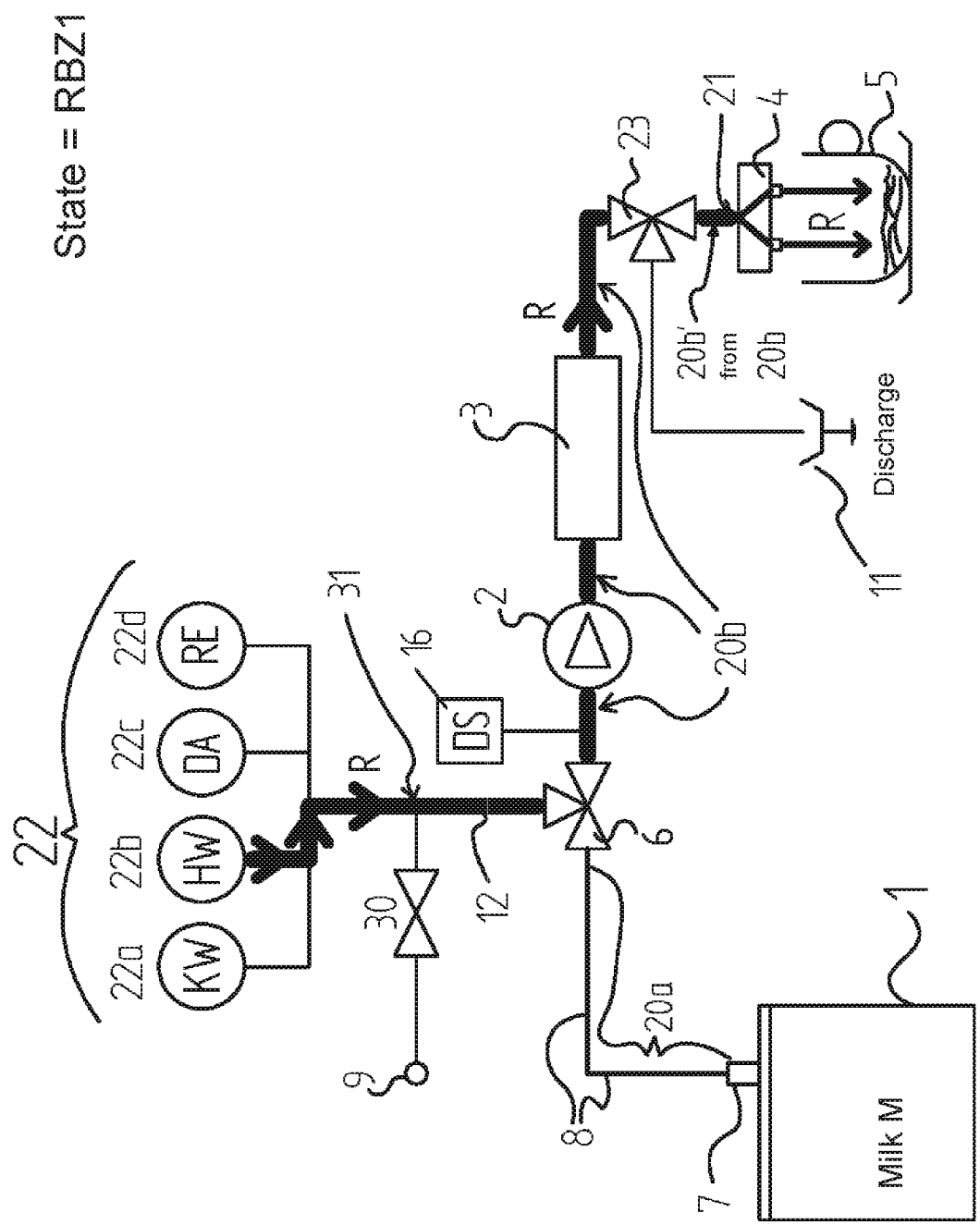
FIG. 2 shows the first cleaning operation state of the first embodiment.

In FIG. 2, a basic cleaning state or the first cleaning operation state (subsequently termed "RBZ1") is shown, in which the following takes place.

The three-way junction (6) or (6', 6") is connected such that cleaning agent R (originating from the reservoir (22), here from the part of the reservoir (22b)), flows via the transport line (12) and the entrance of the junction (6) connected to the latter and also via the entrance of the junction (6) connected to the outflow portion (20b) into the outflow portion (20b). Hence the entrance of the junction (6) connected to the inflow portion (20a) closes. The cleaning agent R flows through the pump (2), the system (3), the outflow valve (23) and also the portion (20b') and hence flows via the end (21) of the milk transport line (20) into the milk dispensing device (4) and from there into the cup (5). In the case of this basic cleaning, the line (12), the line portion (20b) (including the elements (2, 3, 23) situated therein) and also the dispensing device (4) are hence cleaned. The milk system can hence be subjected to a basic cleaning independently of the supply container (1).

The remaining hose portion (8) including first connection (7) on the milk container (1) is in practice subject to less contamination than the conveying means (2) and also the system (3): with respect to elements (2, 3), it must however be ensured that no milk build-up via proteins takes place and that no germs can form or that, after their growth, these are broken down again promptly to a tolerable quantity.

The basic cleaning RBZ1 can be implemented in intervals. The first connection (7) can be inserted also into its parking position during this time, i.e. be connected to the second connection (9). (See in this respect also FIG. 3.) The basic cleaning RBZ1 can be implemented once daily or during stop times or at less busy times. It can also take place in conjunction with the daily coffee machine cleaning. No manual cleaning by the user is required. For example, the basic cleaning program for RBZ1 (stored in the memory of the coffee machine) can be started on a display of the coffee machine (not shown). A typical time duration is 5 to 15 minutes.

Figure 3:
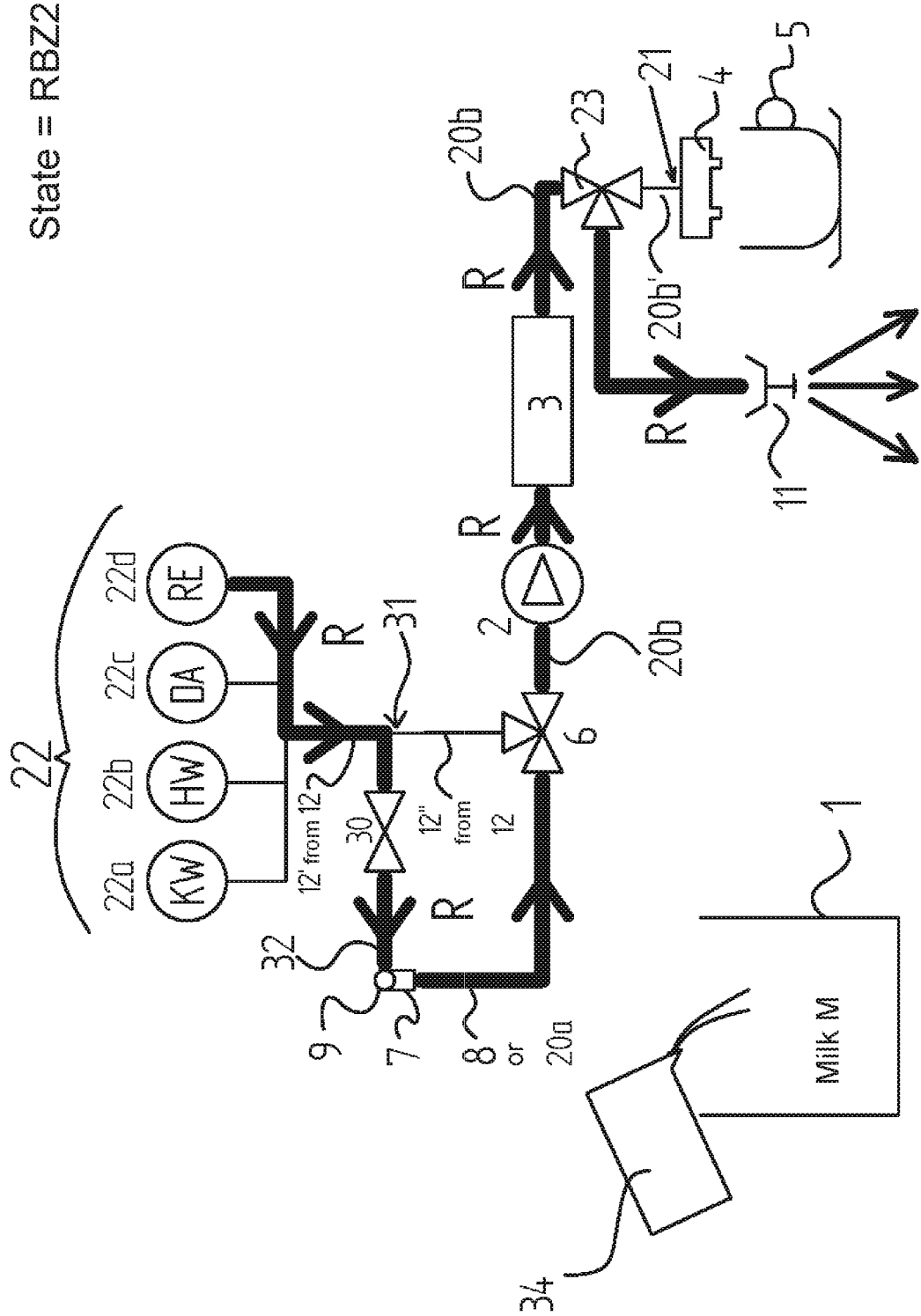
FIG. 3 shows the second cleaning operation state of the first embodiment.

FIG. 3 shows the second cleaning operation state (abbreviated to RBZ2). This represents here rapid cleaning.

In RBZ2, the first connection (7) is connected to the second connection (9) in a fluid-impermeable manner. The junction (6) is connected such that the entrance of the junction (6) connected to the inflow portion (20a) and the entrance of the junction (6) connected to the outflow portion (20b) are connected for fluid passage. Thus the entrance of the junction (6) connected to the transport line (12) closes. The valve (30) is switched to open. Hence cleaning agent R can flow from the reservoir (22) (here out of the part (22d)) via a portion (12') of the line (12) which is situated between the reservoir (22) and the entry (31) into the valve (30), from there (in the line (32) via the second connection (9) and the first connection (7) into the hose (8) or the inflow portion (20a), through the junction (6) and into the outflow portion (20b).

In the outflow portion (20b), the cleaning agent R flows through the conveying means (2), the system (3) and the valve (23). The latter is connected here such that the cleaning agent R is discharged via the discharge (11). In other words, in the state shown in FIG. 3, the part (20b') of the outflow portion (20b) (and hence also the dispensing device (4)) is not cleaned. Of course, the valve (23) can however also be connected such that both the discharge (11) and the elements (20b') and (4) are subject to a flow of cleaning agent R. In the illustrated state, that line portion (12") of the transport line (12) which exists between the entry (31) and the entrance of the junction (6) to the line (12) remains likewise uncleaned.

The rapid cleaning RBZ2 can likewise be implemented several times daily during filling (via a further external container (34) of the milk supply container (1)). Refilling of the milk M in the container (1) can hence be effected if both connections (7) and (9) are coupled together in a fluid-impermeable manner. This washing RBZ2 of the milk path (20a), (20b) requires a typical duration of 1 to 2 minutes. In the state RBZ2, also the hose (8) including connection (7) can hence be subjected to cleaning. The stretch can thereby be washed via the line (12) (portion (12')) and the cleaning agent R can be discharged via the discharge (11). Of course, also the cleaning agents of the reservoir chambers (22a) to (22c) other than cleaning agent R can flow through the path shown in FIG. 3, with corresponding control of the device.

The second connection (9) or also the first connection (7) can comprise sensor means (for example in the form of a Reed- or Hall sensor). This sensor means can detect whether a fluid-impermeable coupling of the elements (7) and (9) exists. The sensor element can, provided such a coupling exists, trigger the washing cycle shown in FIG. 3 automatically. In order that the connection of the elements (7) and (9) is not inadvertently released before the end of such a washing cycle, an actuator can also be provided, which serves as locking aid (for example locking motor, electro-magnet or a locking aid assisted hydraulically or pneumatically). For simplification, instead also an optical means (state display on a display of the device) can be provided, which signals whether the cleaning process has finished or not. This can be effected for example (instead of an indication on the display) also in the form of a light at the connection region. The state indicator can also be effected in the form of an animation on the display.

In particular with the state RBZ2, it is ensured that the milk system or the milk supply device can be cleaned in a highly automated manner, also the milk collection being cleaned regularly. If the first connection (7) (with the hose (8)) cannot be cleaned over a fairly long duration since for example a large quantity of milk M is stored in the container (1) or a low consumption of milk simply takes place, then the milk supply device can also be configured for a compulsory washing in which the user is required to initiate the washing cycle RBZ2: for this purpose, the user must merely connect together the two connections (7) and (9) manually.

Figure 4:
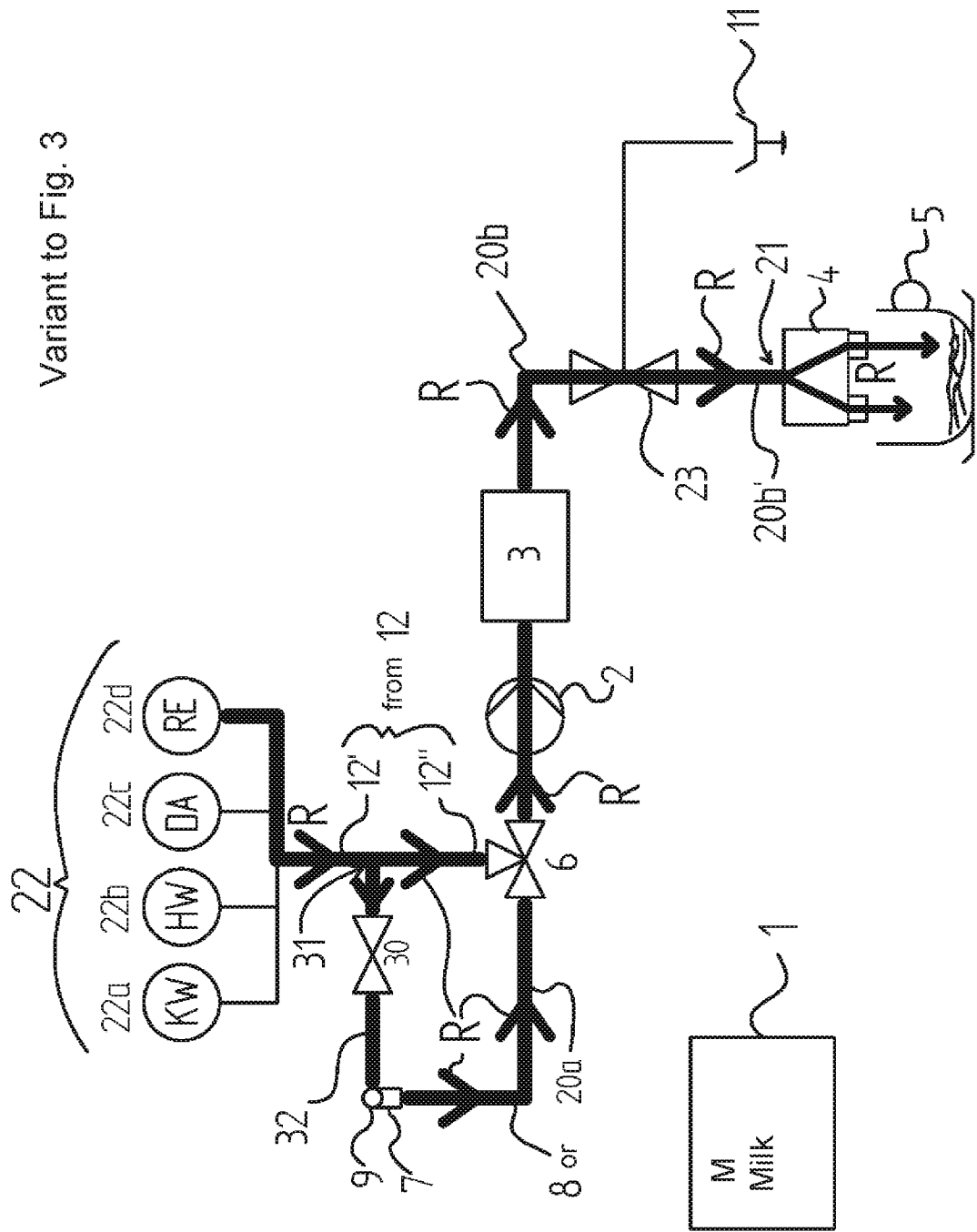
FIG. 4 shows a variant of the first embodiment.

In a variant of the first embodiment, FIG. 4 shows a milk supply device according to the invention in a fully automatic coffee machine which offers the possibility of an intensive cleaning. The construction hereby follows the construction shown in FIGS. 1 to 3 simply with the difference that the three-way junction (6) here is configured as 3/2-way valve.

The connection positions in the case of this intensive cleaning are such that both the entrance of the valve (6) which is connected to the transport line (12) (or the portion (12") of the same) and the entrance of the valve (6) which is connected to the inflow portion (20a) or to the hose (8), is opened for the inflow of cleaning agent R. The means R here originates from the chamber (22d) of the reservoir (22). It can be switched to and fro cyclically between the following states: in a first state, cleaning agent R flows via the entry (31), the valve (30), the two connections (9), (7) and the hose (8) into the valve (6). In a second state, cleaning agent flows directly from the entry (31) via the portion (12") into the valve (6). The entrance of the valve (6) connected to the outflow portion (20b) is likewise opened and serves for outflow of the cleaning agent R which has flowed together from the line portions (8) and (12"). The discharge of the cleaning agent R downstream of the elements (2), (3) and (23) is effected here via the portion (20b'), i.e. through the dispensing device (4). The 3/2-way outflow valve (23) can however also be connected such that cleaning agent R is discharged in addition also via the discharge (11).

The shown intensive cleaning can be implemented once a week as chemical and/or mechanical cleaning. All the components which come in contact with milk can thereby be cleaned. Use of cleaning- and/or disinfection agent R is also possible in a high concentration. Also long acting times (duration: 15 to 30 minutes or even longer, e.g. 1 to 2 hours) are possible. Also dismantling of components or parts for manual cleaning or for cleaning in a dishwasher can be effected if desired. The milk supply container (1) is decoupled from the milk supply device in the state shown in FIG. 4.

FIG. 5 shows a second embodiment of a milk supply device according to the invention in a fully automatic coffee machine. The construction is thereby basically the same as in the first embodiment so that only the differences are described subsequently (identical reference numbers describe identical or corresponding components to the first embodiment).

In the second embodiment, the components (9), (30), (31) and (32) are omitted. In addition (not present in the first embodiment), a bypass line (10) which is a flexible, flexible in sections or also completely rigid (the latter as tubing) is provided, which is connected to the discharge (11) at one of its ends or leads into the discharge (11). At the end situated opposite the discharge (11), the bypass line (10) has a third connection (33) which can be connected detachably to the first connection (7). FIG. 5 shows a state in which the third connection (33) and the first connection (7) are connected together in a fluid-impermeable manner. In the embodiment of FIG. 5, in addition the junction (6) is configured as 3/3-way valve.

With the embodiment shown in FIG. 5, likewise an intensive cleaning can be implemented, which is termed subsequently also third cleaning operation state, abbreviation: RBZ3. For this purpose, the valve (6) opens both the inflow portion (20a) and the outflow portion (20b) for flowing through with cleaning agent R. Cleaning agent R can hence flow from the transport line (12) into the valve (6) and via the hose (8) or inflow portion (20a), the first connection (7), the third connection (33) and the bypass line (10) into the discharge (11). At the same time in RBZ3, cleaning agent R can flow out of the line (12) via the valve (6) also through the conveying means (2), the system (3), the valve (23) and the milk dispensing device (4) into the cup (5). In RBZ3, the 3/3-way valve (23) is connected such that all of its three entrances are opened. Therefore cleaning agent R also flows in addition via the valve (23) into the discharge (11).

The milk supply device of FIG. 5 can however also be used for a rapid cleaning if the valve (6) opens exclusively the path (20a) (cleaning agent flow only via the elements (8), (7), (33) and (10) into the discharge (11)).

Figure 6:
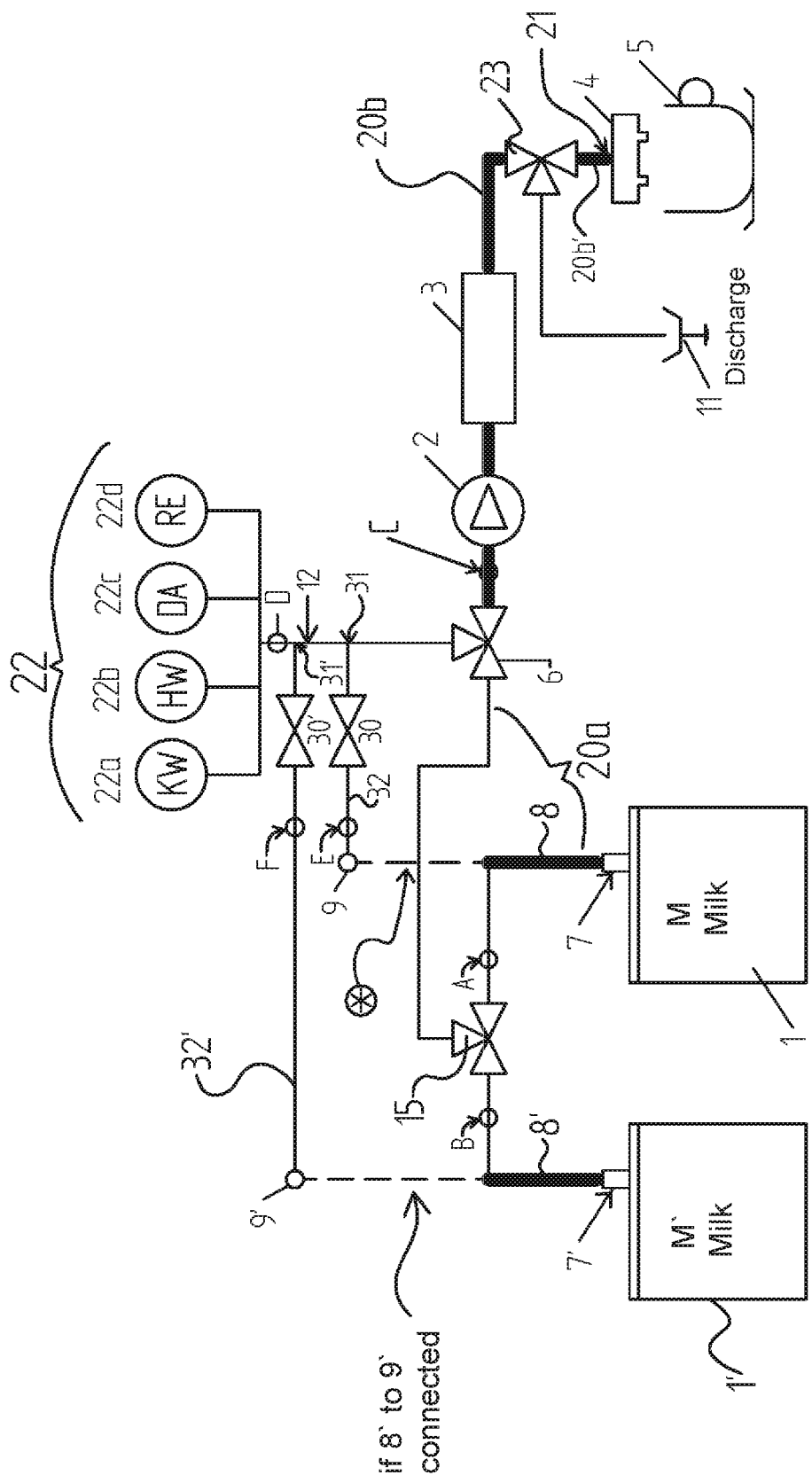
FIG. 6 shows a third electrical coffee machine according to the invention with milk supply device according to the invention.

FIG. 6 shows a third embodiment of a milk supply device in a fully automatic coffee machine according to the invention. Just as in the first embodiment, the states MFBZ, RBZ1 and RBZ2 and, analogously to FIG. 4, also the cleaning operation state shown in the last-mentioned Figure, are possible in the third embodiment. This is the case by a switch being able to be made in particular by means of the three-way junction (6) between the individual operating states. The valve (6) is configured as 3/3-way valve in the third embodiment.

The third embodiment (FIG. 6) has all the components of the first embodiment (FIGS. 1 to 3). Furthermore, additional components (7'), (8'), (9'), (30'), (31'), (32') and (15) are provided and the following differences are present. In addition to a (first) milk supply container (1), a second milk supply container (1'), in which here a different type of milk M' is present, is provided. The inflow portion (20a) comprises, in addition to the first connection (7) and the flexible hose (8) connected thereto (for connection to the container (1)), a further first connection (7') which is connected to a further flexible hose (8'). Via the elements (7') and (8'), the inflow portion (20a) is connected in addition (in addition to the connection to the container (1)), also to the further external container (1'). For this purpose, a further 3/2-way valve (15) is provided, which has a first entrance which is connected to the end of the hose (8') which is situated orientated away from the further first connection (7') and which has a second entrance which is connected to the end of the hose (8) which is situated orientated away from the first connection (7). The third entrance of the valve (15) is connected via a rigid pipe line portion of the inflow portion (20a) to that entrance of the valve (6) which is not connected to the line (12) and not to the outflow portion (20b). The valve (15) and this rigid pipe line portion are thereby positioned inside a (not shown here) housing of the fully automatic coffee machine such that merely the portions of the hoses (8) and (8') which are situated orientated away from the valve (15) are positioned, with their connections (7) and (7'), outside said housing.

As described previously for the first embodiment, the first connection (7) can be connected to the second connection (9) in a fluid-impermeable manner. See in this respect the broken line between (7) and (9). In addition, the fully automatic machine has a further second connection (9') which opens via a further line (32') and also a further 2/2-way valve (30') (which is constructed like the valve (30)) via a further entry (31') into the transport line (12). The further entry (31') is thereby configured likewise as a T-shaped line piece and is positioned between the reservoir (22), on the one hand, and the entry (31), on the other hand. The further second connection (9') is configured such that, after removal of the further first connection (7') from the milk container (1'), it can be connected to the further first connection (7') in a fluid-impermeable manner. See in this respect the broken line between (7') and (9').

According to the connection position of the valve (15), in the milk flow operating state MFBZ (if (7) and/or (7') is/are in the connected state to the milk containers (1), (1')), either milk M' can flow out of the container (1') or milk M out of the container (1) via the valve (15) via the inflow portion (20a) and the valve (6) into the outflow portion (20b) (in the case of blocked entrance of the valve (6) to the line (12)).

Cleaning operation states, RBZ, are consequently possible by the first connection (7) being paired with the second connection (9) and/or the further first connection (7') being paired with the further second connection (9'). Then the valves (30) and (30') which are closed in the MFBZ can be opened.

For example, an intensive cleaning state, as shown in the variant of the first embodiment according to FIG. 4, is possible: pairing of the connection pairs (7) and (9) and also (7') and (9'), i.e. uncoupling from the containers (1) and (1'). Opening of the two valves (30) and (30'). Connection of the 3/2-way valve (15) such that an inflow either from the hose (8) or from the hose (8') and an outflow towards the valve (6) is made possible. Connection of the valve (6) such that either an inflow from the inflow portion (20a) or from the valve (15) or from the transport line (12) is made possible (between these two states, cyclical switching to and fro can take place). The cleaning agent which flowed into the valve (6) discharges via the outflow portion (20b). Other RBZ, such as e.g. a state analogous to RBZ2 according to FIG. 3 (in this case, the entrance of the valve (6) which is connected to the line (12) closes) are likewise possible.

Hence, the milk supply device according to the invention can also be extended for a plurality of milk containers (1), (1'), the valve (15) being able to be used for switching between the various milk containers. The valve (15) can alternatively also be constructed from two individual 2/2-way valves or from two hose clamp valves. In order to enable a desired parallel rapid- and intensive cleaning, the additional connection is provided via the connections (7') and (9').

FIG. 6 shows in addition six line connections A, B, C, D, E and F of a multiple connection device (500), as is described subsequently in FIGS. 8 to 10. According to the position of the device (500), different throughflow states of the milk supply device shown in FIG. 6 are made possible. See in this respect also the subsequent description relating to FIGS. 8 to 10.

Figure 7:
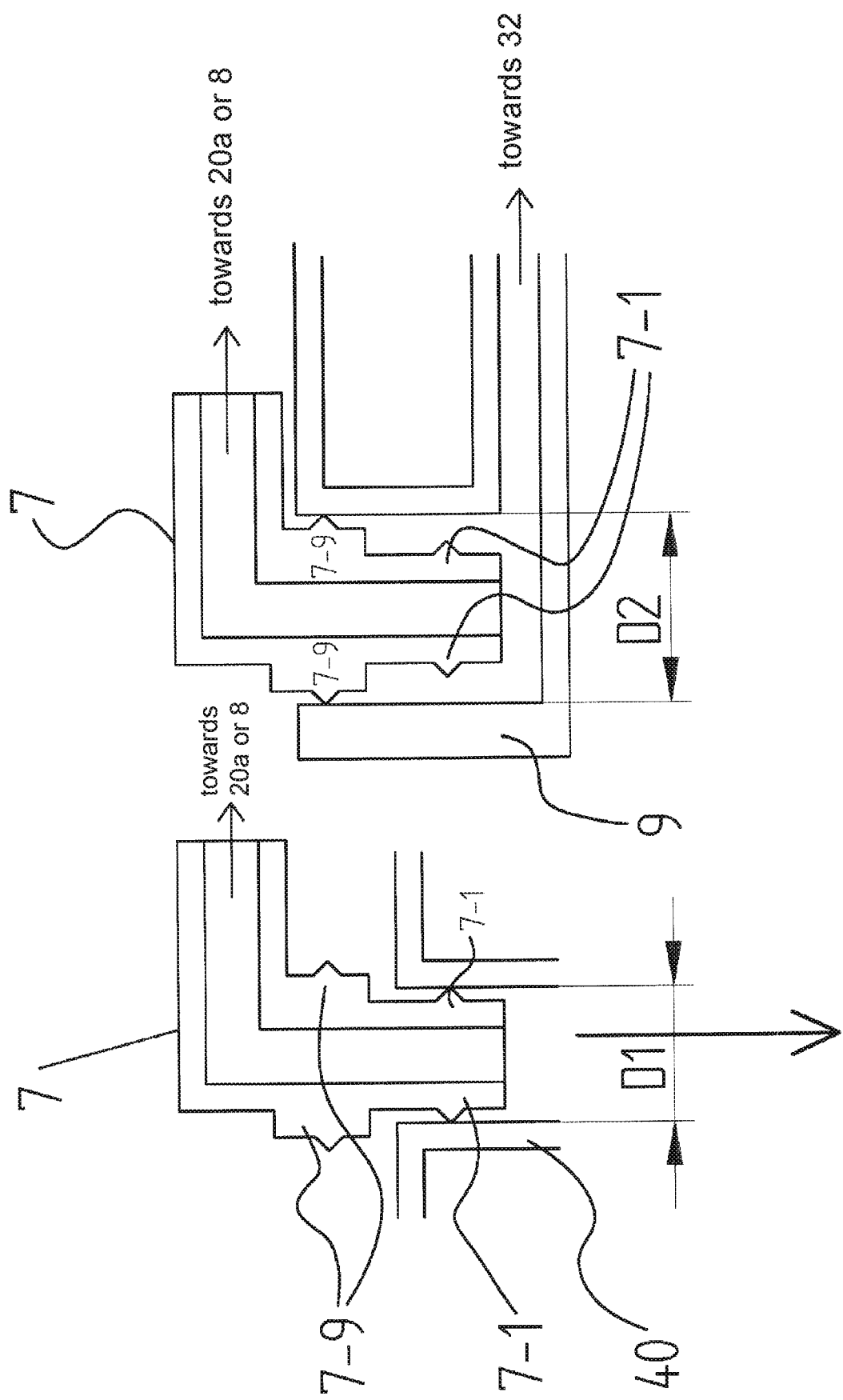
FIG. 7 shows a first connection and a second connection, as can be used in the milk supply devices according to the invention of FIGS. 1 to 6.

FIG. 7 shows in detail how the first connection (7) and the second connection (9) (likewise: the further first connection (7') and the further second connection (9') according to FIG. 6)) can be configured. The first connection (7) has, at its end situated orientated away from the hose (8) (and viewed in the direction away from the hose (8)), firstly a second connection portion (7-9) and thereafter a first connection portion (7-1). The diameter of the first connection portion (7-1) is configured such that it can be introduced, in a form fit and also in a fluid-impermeable manner, to form a seal in a milk container connection (40) of the container (1) (not shown in FIGS. 1 to 6). The second connection portion (7-9) has a larger diameter than the first connection portion (7-1).

The diameter of the second connection portion (7-9) is so much larger than the inner diameter of the milk container connection (40) (the latter is also termed D1 in FIG. 7) that the region of the second connection portion (7-9) can no longer be introduced into the connection (40). A fluid-impermeable connection between milk container (1), on the one hand, and a first connection (7), on the other hand, is hence possible merely by means of the first connection portion (7-1) (FIG. 7 on the left).

The second connection portion (7-9) has an outer diameter which is significantly larger than the outer diameter of the first connection portion (7-1) and is shaped such that it (7-9) can be received exactly in a form fit and forming a fluid-impermeable seal by the second connection (9) (cf. FIG. 7 on the right). The inner diameter D2 of the second connection (9) (for which D2>D1 applies) is therefore such that the second connection (9) surrounds the second connection portion (7-9) in the connected state of (7) and (9) on the external circumference side. After detaching the first connection (7) from the milk container (1), hence a fluid-impermeable connection of the two connections (7) and (9) can be produced according to FIG. 7 on the right by firstly the first connection portion (7-1) and, subsequently, also the second connection portion (7-9) (the latter then forming a seal in the second connection (9)) being introduced into the second connection (9).

The connection (7) is therefore configured in two stages, a first sealing diameter D1 being able to be paired with the milk supply container (1) and a second sealing diameter D2 being able to be paired with the connection (9). This has the advantage that, in the state shown on the right in FIG. 7, the first connection portion (7-1) can be washed completely with cleaning liquid R (not shown in FIG. 7) inside the connection (9). Consequently, it becomes possible to avoid cross-contamination in the region D1 or (7-1) when connecting the first connection (7) (or the further first connection (7')) to a new or a cleaned milk supply container (1).

As described already, as separating means of the three-way junction (6) or (6',6") between cleaning supply and return flow safety device for the milk supply, a simple 3/2-way valve or a simple 3/3-way valve can be used (e.g. as magnetic valve). However also (in particular in the case of FIG. 6—therefore this (500) is also indicated in FIG. 6), a multiple connection device (500), as is shown in FIGS. 8 to 10, can be used in all embodiments as 3-way junction.

Figure 8:
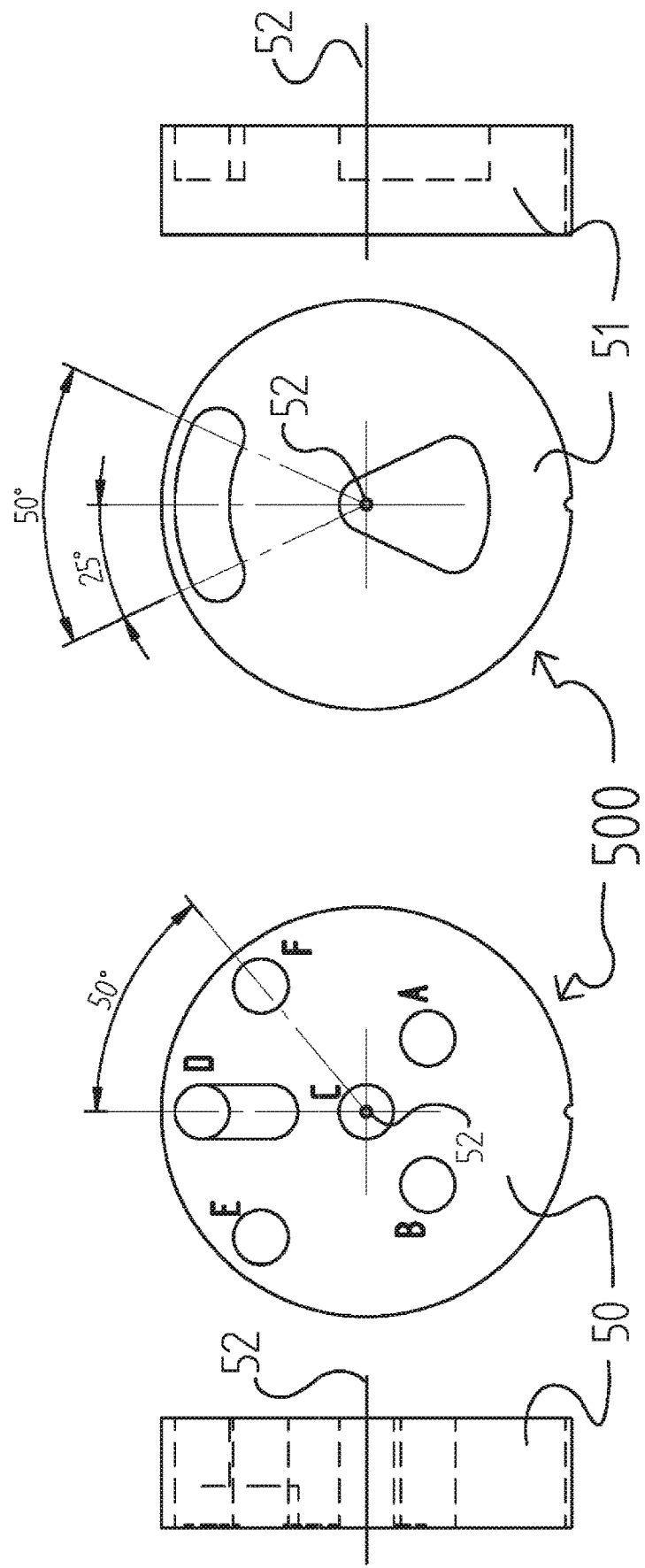
FIG. 8 shows a multiple connection device which can be used as three-way junction according to the invention, as can be used in all embodiments according to the invention, but in particular in the third embodiment according to FIG. 6.

FIG. 8 shows a multiple connection device (500) with six line connections A to F which, together with line portions (not shown) connected to these line connections can form both the fluid guides of the three-way junction (6) according to FIGS. 1 to 5 and the extended fluid path guides according to FIG. 6.

The device (500) has two flat cylindrical disc elements (50) and (51) which are mutually rotatable about a common axis of rotation (52). The element (50) (on the extreme left in FIG. 8 in a sectional view parallel to the axis of rotation (52) and on the left in FIG. 8 in a plan view on the axis of rotation or viewed in a plane perpendicular to the axis of rotation (52)), thereby has all of the line connections A to F as precisely six through-borings or through-holes (the line connection D has, in addition to its through-hole, also as well a sink hole region, cf. also the vertical broken line in FIG. 8 on the extreme left). The second disc element (51) (FIG. 8 on the right: plan view on the axis of rotation (52); FIG. 8 on the extreme right, sectional view parallel to the axis of rotation (52)) has, in contrast, only exactly two connection chambers, namely an oblong, curved connection chamber (FIG. 8 on the right at the top) and an approximately triangular connection chamber. The oblong connection chamber extends along the outer circumference of the disc element (51), the triangular connection chamber extends from a region of the disc situated on the external circumference side into the centre of this disc (51) and thereby encompasses also the axis of rotation (52).

Figure 9:
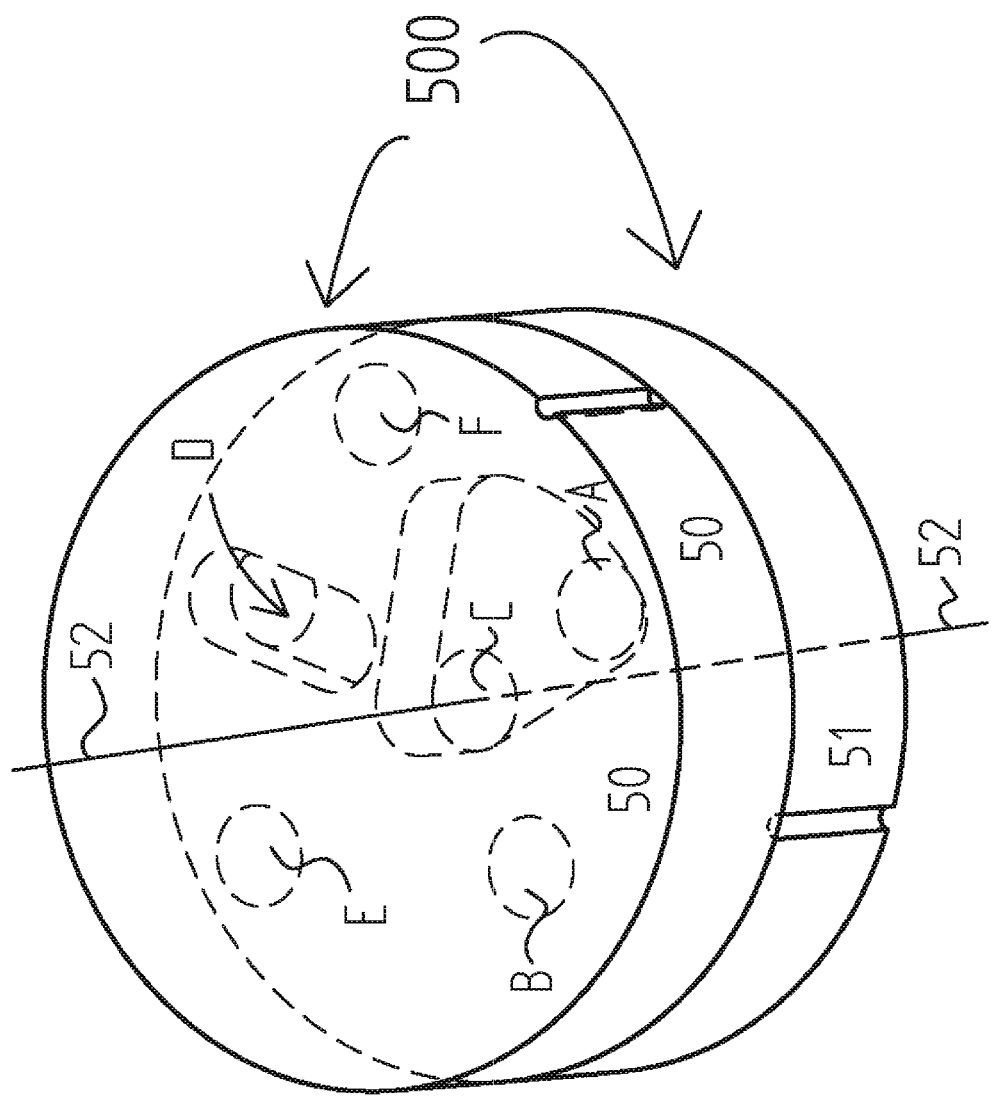
FIG. 9 shows the multiple connection device in assembled form.

The two flat cylindrical discs (50), (51) are, cf. FIG. 9, placed one above the other flush and abutting directly one against the other. Rotation of the two discs (50), (51) relative to each other about the axis of rotation (52) makes it possible (in particular via the sink boring portion of the line connection D in the disc (50) and also via the two through-holes in the disc (51)), to connect together in pairs different ones of the line connections A, B, C, D, E and F.

If FIGS. 6 and 8 are considered, then for example rotation of the disc element (51) in clockwise direction by 25° (from the position shown on the right in FIG. 8) over the inside of the device (500), can effect both a connection of the two line connections D and F and, at the same time, connection of the two line connections B and C (the disc (50) thereby remains in its position shown on the left in FIG. 8). Hence a cleaning agent flow via the entry (31') from the reservoir (22) to the further second connection (9') (according to valve (30')) and from the further first connection (7') (provided the latter is connected to the connection (9') in a fluid-impermeable manner)—according to the valves (15) and (6)—to the pump (2) and hence to the milk dispensing device (4) is made possible (fluid path D→F→(9')→(7')→B→C).

FIG. 9 shows the device (500) in assembled form. FIG. 10 shows which line connections of connections A to F, according to different angles of rotation or relative positions about the axis of rotation (52), lead to which fluid line connections (via the inside of the device (500)).

By means of second discs (50, 51) which are rotatable relative to each other (or a stationary disc (50) and a disc (51) which is rotatable relatively thereto), a complex valve can hence be produced in a simple manner, with which valve different fluid paths can be switched to different "consumers". As a result of the geometric configuration according to FIGS. 8 and 9, the valves (6) (or (6', 6")), (15), (30) and (30') can be combined, e.g. in the embodiment according to FIG. 6, in precisely one or a single multiple connection device (500). The inner valve geometry of the device (500) is thereby configured to have no dead space. The basic unit of this device (500) offers, for this purpose, the six connections A to F according to FIG. 6. The pair of connections E-F can advantageously be configured such that both second connections (9) and (9') can be produced at the same time. The connection pair A-B can be configured geometrically such that it also configures a connection for both milk suction hoses (8) and (8') at the same time.

The two discs (50), (51) can be rotated away from each other in their angular positions and hence form the most varied of fluid paths. In the two internal main views, FIG. 8 shows respectively the sealing faces which are illustrated one above the other in FIG. 9. FIG. 10 shows the valve connection paths or fluid paths which are produced as a function of the angular position of the two discs (50), (51) relative to each other. Example: angular position 75° ("normal operation milk 1", cf. FIG. 10) with connection of the line connection A and the line connection C. The line connections B, D, E and F are closed in this angular position. The two discs (50), (51) can be rotated relative to each other or away from each other by a motor.

Such a rotational movement of the discs (50), (51) relative to each other about the axis (52) can be used in order to lock together the connection of the connections (7) and (9) or (7')

and (9') for example in position −25° and 25° (cf. FIG. 10) in order that no release of these connections is possible before the cleaning with cleaning agent R is completed. During the cleaning states, during use of a plurality of types of milk M, M' switching can hence also take place to and fro respectively between different positions. In particular, short switching paths between the two types of milk M' and M are produced for the rapidly occurring rapid cleaning. It is thereby excluded in each angular position of the two discs (50), (51) relative to each other that cleaning agent R can flow into one of the milk containers (1), (1').

The present invention hence enables a two-stage cleaning approach, as follows: a first (completely automated) stage is possible by supplying a cleaning agent R or a plurality of cleaning agents R from the reservoir (22) or the chambers (22a) to (22d) thereof, also during connection of the milk supply device to the external container (1) or the containers (1), (1') without intervention by a user (in particular: automated start and automated implementation of the cleaning). In a second stage, the short time of a milk filling in the container (1) or (1), (1') or of a milk container change is used for washing the hose (8) or the hoses (8), (8') and in particular for disinfection of the hose-side milk connection region (7) or regions (7), (7'). The first stage can be effected at regular intervals or even, as a function of the usage, at short intervals during the daily operation. The second stage is perceived merely unconsciously by the user since this takes place during a normal operating treatment.

With the invention, a high-grade automated implementation of cleaning steps can be achieved. Likewise the number of germs in the milk can be kept at a low level or be stabilised. For this purpose, a sequence of cleaning steps can be defined or different cleaning operation states, RBZ, can be implemented in succession. An operation of the milk supply device or of the coffee machine can be ensured without the user perceiving any actually implemented cleaning or with minimal perception of such a cleaning by the user.

A very rapid disinfection of the connection region is possible. Cross-contamination during container changes can be prevented. Washing thoroughly with cleaning agent R can take place at small operating intervals virtually at will. Numbers of germs in the milk supply device or the coffee machine can be reduced by washing and cleaning procedures with minimal input on the part of the user. Even a region of the milk connection line which is not cleaned regularly is tolerant to germs: exchange of the milk or supplying fresh milk into this hose portion leads in fact to hundred-percent cleaning not being required. This is the case since, in this portion, the milk is subject merely to a low germ loading since simple geometries are present and hence excess germ formation is prevented there. Cleaning of this milk portion is therefore ultimately only required at fairly long intervals.

With such an operational course, processing of milk can be operated over a long maintenance interval without or almost without being dependent upon user cleaning.

A multiple connection device can be used in which, by corresponding switching of mechanical connection positions with electrical signals which act in turn on mechanical positional grids, a combination of connection positions is excluded in which the result is contamination of the milk supply with cleaning agents R.

Hence the following features can be highlighted:
Different cleaning procedures are combined.
These procedures run completely automatically or almost completely automatically in the background so that the user does not perceive them or practically not.
The result is stabilisation of the numbers of germs in the milk at a low level or a reduction in the number of germs.
Consequently milk can be processed over a relatively long period without special cleaning procedures requiring to be implemented by a user (in which e.g. also no milk products can be sold).

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A milk supply device for supplying milk from a milk supply container to a milk dispensing device, the milk supply device comprising:
a milk transport line which is suitable to be connected or is connected at a first end thereof to the milk supply container and with which, via a second end thereof, milk which has been taken from the milk supply container is deliverable to the milk dispensing device; and
a cleaning agent transport line in fluid communication with the milk transport line between the first end and the second end via a three-way junction, the three-way junction configured to operate optionally either:
in a milk flow operating state, milk is transportable via the three-way junction from the milk supply container to the milk dispensing device whilst the milk transport line at the same time is sealed off in a fluid-impermeable manner relative to the cleaning agent transport line by the three-way junction, or
in one or more cleaning operation state/states, a cleaning agent is conductible from the cleaning agent transport line via the three-way junction in a direction towards the milk dispensing device or in a direction towards a discharge of the milk supply device or in a direction towards the milk dispensing device and to-wards a discharge of the milk supply device;
wherein the milk transport line comprises an inflow portion which is in fluid communication with the three-way junction, and an outflow portion which is in fluid communication with the three-way junction;
wherein the inflow portion is configured to be not completely rigid and has a first connection at the first end of the milk transport line orientated away from the three-way junction;
wherein the milk supply device has a second connection which is in fluid connection with the cleaning agent transport line;
wherein the first connection is detachably connectable to the second connection such that, in the connected state, a fluid connection leading via the first and the second connections exists between the cleaning agent transport line and the inflow portion; and wherein, in the connected state, a fluid connection leading via the first and the second connections and the inflow portion exists between at least a portion of the cleaning agent transport line and the three-way junction.

2. The milk supply device according to claim 1, wherein the milk supply device is operable such that a fluid is introduced into the three-way junction via the inflow portion and discharged again from the three-way junction via the outflow portion.

3. The milk supply device according to claim 1, wherein the three-way junction is operable in a first cleaning operation state such that:

the cleaning agent is conductible from the cleaning agent transport line, which opens into the three-way junction, via the three-way junction in the direction towards the milk dispensing device, by the cleaning agent being conducted through the three-way junction via the outflow portion in the direction towards the milk dispensing device, the inflow portion sealed in a fluid-impermeable manner relative to the cleaning agent transport line by the three-way junction.

4. The milk supply device according to claim 3, wherein the milk supply device comprises a return flow safety device, which is configured for monitoring whether a return flow of the cleaning agent from the outflow portion, or from the cleaning agent transport line, or from the outflow portion and from the cleaning agent transport line, is effected through the three-way junction into the inflow portion during operation of the milk supply device in one or more of the cleaning operation states.

5. The milk supply device according to claim 1, wherein the inflow portion is configured to be movable at least in portions wherein, in the connected state, a fluid connection leading via the first and the second connections and the inflow portion exists between at least a portion of the cleaning agent transport line, which is orientated towards a cleaning agent reservoir and the three-way junction.

6. The milk supply device according to claim 5, wherein the inflow portion is flexible.

7. The milk supply device according to claim 1, wherein the three-way junction is operable in a second cleaning operation state such that:

the cleaning agent is conductible from the cleaning agent transport line towards the first and second connections which are situated in the connected state, from the first and the second connections via the inflow portion into the three-way junction, from the three-way junction via the outflow portion, and finally via the milk dispensing device and/or the discharge from the milk supply device.

8. The milk supply device according to claim 7, wherein the three-way junction is operable such that the cleaning agent is conductible from the cleaning agent transport line, preferably via the portion of the cleaning agent transport line, orientated towards a cleaning agent reservoir, and a second portion of the cleaning agent transport line orientated away from a cleaning agent reservoir, directly, without flowing via the first and second connections which are situated in the connected state and via the inflow portion, the cleaning agent is conductible into the three-way junction, the cleaning agent is conductible from the three-way junction via the outflow portion, and the cleaning agent is dischargeable via the milk dispensing device or the discharge from the milk supply device or via the milk dispensing device and the discharge from the milk sup-ply device.

9. The milk supply device according to claim 1, wherein the first connection and/or the second connection has/have a connection state detection device, the connection state detection device configured to ascertain whether the first connection and the second connection are situated in the state of connection to each other or not, or wherein the first connection and/or the second connection has/have a connection release-prevention device with which, if the first and second connections are situated in the state of connection to each other and if the milk supply device is in one of the cleaning operation states, release of the connection between the two connections can be prevented.

10. The milk supply device according to claim 1 wherein the first connection comprises a first connection portion configured for fluid-impermeable connection of the first connection to the milk supply container, and a second connection portion configured for fluid-impermeable connection of the first connection to the second connection.

11. The milk supply device according to claim 1, wherein the milk supply device has a bypass line which is connected to a discharge of the milk supply device, wherein the bypass line has a third connection at an end of the bypass line orientated away from the discharge, and wherein the first connection is detachably connected to the third connection such that, in the connected state, there exists a fluid connection which leads via the cleaning agent transport line, the three-way junction, the first and the third connection connections, and the bypass line into the discharge.

12. The milk supply device according to claim 11, wherein the three-way junction is operable in a third cleaning operation state such that:

the cleaning agent is conductible, in the connected state of the first connection and of the third connection, via the cleaning agent transport line, the three-way junction, the connected first and third connections and the bypass line into the discharge and is dischargeable from the milk supply device via the discharge.

13. The milk supply device according to claim 1, wherein the three-way junction is operable in multiple cleaning operation states or is operable in at least two cleaning operation states selected arbitrarily from the first, the second, and the third cleaning operation states.

14. The milk supply device according to claim 13, wherein the three-way junction is configured to be operated optionally or switchably in all of the first, the second, and the third cleaning operation states.

15. The milk supply device according to claim 1, wherein the three-way junction comprises a valve or a combination of several valves.

16. The milk supply device according to claim 15, wherein the three-way junction comprises a 3/2-way valve, a 3/3-way valve, precisely two valves, or a combination of a hose clamp- or squeezed tube valve and a 2/2-way valve.

17. The milk supply device according to claim 1, wherein the first end of the milk transport line is configured for simultaneous fluid-impermeable connection to several different milk supply containers, or wherein the milk supply device is operable such that milk is transportable from precisely one of multiple milk supply containers to the milk dispensing device.

18. The milk supply device according to claim 1, wherein a multiple-connection device comprises or forms the three-way junction, wherein the multiple-connection device has at least two disc elements, which can be rotated against each other about an axis of rotation, and a plurality of line connections, and wherein depending on the relative position of the disc elements towards each other around the axis of rotation, respectively different ones of the line connections, which lead through an interior of the multiple-connection device, are connected to each other for fluid guidance.

19. The device according to claim 1 included in a drinks preparer, an electrically operable coffee machine, or a fully automatic coffee machine.

* * * * *